United States Patent Office 3,823,173
Patented July 9, 1974

3,823,173
NICKEL COMPLEXES FOR CURING POLYCHLOROPRENES
Rolland Shih-Yuan Ro, Wilmington, Del., assignor to E. I. du Pont de Nemours and Company, Wilmington, Del.
No Drawing. Filed Oct. 11, 1972, Ser. No. 296,567
Int. Cl. C07f 15/04
U.S. Cl. 260—439 R                                4 Claims

ABSTRACT OF THE DISCLOSURE

Novel complex compounds of two moles of 2-dimethyl-aminoethanol with one mole of nickel thiocyanate or nickel chloride, which can be prepared by a process comprising mixing at least two moles of the 2-dimethylaminoethanol with one mole of the nickel salt in a solvent in which the nickel salt is soluble and evaporating off the solvent and any 2-dimethylaminoethanol in excess of 2 moles per mole of nickel salt, are useful in improved processes for vulcanizing dialkyl xanthogen disulfide-modified chloroprene polymers by heating said polymer in contact with zinc oxide and with the nickel complex compounds as curing agents.

Background of the Invention

Hagman U.S. Pat. 3,686,156, issued Aug. 22, 1972, discloses the preparation of chloroprene polymer vulcanizates having superior tensile strength by using as the chloroprene polymer a solid, sol polymer which has been polymerized in the presence of a dialkyl xanthogen disulfide and using as the curing agent an effective amount of an amine or a compound which decomposes to an amine at curing temperatures. This patent states that an especially versatile amine is 2-dimethylaminoethanol (DMEA) and salts and esters thereof with organic carboxy-containing acids or reaction products with organic isocyanates.

Unfortunately, DMEA has a disagreeable odor. Because it is a rather volatile liquid it is difficult to handle and to incorporate into elastomers using conventional compounding techniques. Many of its salts and esters suffer from one or more disadvantages that make them impractical for use as curing agents. Some of them are also liquids or are hygroscopic solids.

Summary of the Invention

Now according to the present invention it has been found that the foregoing disadvantages of prior art amine curing agents for chloroprene polymers can be avoided, and novel and improved processes for vulcanizing dialkyl xanthogen disulfide-modified chloroprene polymers by heating with zinc oxides are provided by using as curing agents novel complex compounds of two moles of 2-dimethylaminoethanol with one mole of nickel thiocyanate or nickel chloride.

The complex compounds of this invention are produced by processes comprising the steps of mixing at least two moles of 2-dimethylaminoethanol with one mole of nickel thiocyanate or nickel chloride in a solvent in which the nickel salt is soluble, evaporating off the solvent and any 2-dimethylaminoethanol in excess of two moles per mole of nickel salt, and recovering the complex compound as a solid.

Description of the Preferred Embodiments

The nickel-containing complex compound curing agents of this invention can be prepared by methods already described generically hereinabove. In the case of the nickel thiocyanate complex, however, it is convenient to prepare the nickel thiocyanate in situ, starting with potassium thiocyanate and nickel nitrate. The potassium nitrate formed is insoluble in alcohol and is removed by filtration, leaving a solution of nickel thiocyanate which is then reacted with the dimethylaminoethanol.

The complexes of the present invention are solids which are more convenient to use as curing agents than the liquid 2-dimethylaminoethanol from which they are prepared. It is surprising to find that the nickel salt complexes can be used as curing agents in place of the 2-dimethylaminoethanol, since when one uses the zinc chloride or zinc thiocyanate complexes, a serious decrease in processing safety results. This is illustrated in the Examples hereinbelow.

The amount of nickel complex compound used in a curing process of this invention ranges from about 0.8 part to about 10 parts per 100 parts of elastomer. Since each formula weight of the complex gives two moles of the amine, 0.8 gram of the nickel chloride complex will yield about 0.005 gram molecular weight of dimethylaminoethanol. The preferred proportion is about 1 to about 4 parts of the nickel complex compound per 100 parts of elastomer, by weight. Curing temperatures are 121 to 232° C.

The novel nickel complex compounds are broadly applicable as curing agents in processes for vulcanizing chloroprene polymers prepared by polymerizing chloroprene monomers in the presence of dialkyl xanthogen disulfides, but in the substantial absence of free sulfur. Optionally, up to about 50% of the chloroprene monomer can be replaced by another copolymerizable monomer. Examples of sutiable comonomers are:

Vinyl aromatic compounds, such as styrene, the vinyl toluenes and vinyl naphthalenes.

Aliphatic conjugated diolefin compounds such as 1,3-butadiene; isoprene; 2,3-dimethyl-1,3-butadiene; and 2,3-dichloro-1,3-butadiene.

Vinyl ethers, esters, and ketones, such as methyl vinyl ether, vinyl acetate, and methyl vinyl ketone;

Esters, amides and nitriles of acrylic and methacrylic acids, such as ethyl acrylate, methyl methacrylate, methacrylamine and acrylonitrile.

Methods for making suitable polymers and copolymers are disclosed in the above-mentioned Hagman U.S. Pat. 3,686,156 and in Finlay and Hagman U.S. Pat. 3,655,827. Any of the chloroprene-containing polymers of these patents can be used, and the disclosures of the polymer preparation and curing methods of the patents are incorporated herein by reference.

EXAMPLES

The invention will be better understood by reference to the following illustrative examples, in which parts and percentages are by weight unless otherwise indicated.

Example 1

To a solution of 6.5 g. (0.05 mole) of nickel chloride in 100 ml. of methanol at about 50° C. are added 8.9 g. (0.1 mole) of 2-dimethylaminoethanol (DMEA). The reaction mixture is concentrated by evaporation of the solvent and is dried under reduced pressure. The green solids obtained are dried in a vacuum oven at 60° C. for 24 hours. The yield of product obtained is 13 g.

Analyses show the following

|  | Calculated for $NiCl_2 \cdot$ 2DMEA | Found |
|---|---|---|
| N, percent | 9.1 | 8.9 |
| Cl, percent | 23.1 | 22.9 |

Example 2

To a warm solution of 9.7 g. (0.1 mole) of KSCN in 200 ml. of ethanol is added a solution of 14.5 g. (0.05 mole) of $Ni(NO_3)_2 \cdot 6H_2O$ in 100 ml. of ethanol. A white precipitate of potassium nitrate forms immediately and is filtered off leaving as filtrate a solution of Ni(SCN)$_2$. To this solution is added 17.5 (0.2 mole) of 2-dimethylaminoethanol. The deep green solution so formed is allowed to evaporate. The complex of Ni(SCN)$_2$ with dimethylaminoethanol is obtained in the form of a green solid. Analyses shows the following:

|  | Calculated for Ni(SCN)$_2$·2DMEA | Found |
|---|---|---|
| N, percent | 15.8 | 15.7 |
| S, percent | 18.1 | 16.8 |

Example 3

Compounded polychloroprene stocks are prepared in the following way:

A masterbatch is prepared by mixing the following materials on a rubber mill:

| | Parts by Weight |
|---|---|
| Polychloroprene elastomer | 100 |
| N-phenyl-1-naphthylamine | 2 |
| Stearic acid | 0.5 |
| Semi-reinforcing furnace black | 58 |
| Aromatic process oil ("Sundex" 790, Sun Oil Co.) | 10 |

The above masterbatch is then compounded as follows:

| | |
|---|---|
| Masterbatch | 200 |
| Magnesia | 4.4 |
| Zinc oxide | 5.5 |
| Curing agent (as shown) | 2.2 |

The elastomer is a mixture of sol polychloroprene (78 parts) and gel polychloroprene (22 parts) prepared by the method described in Finlay and Hagman U.S. Pat. 3,655,827. The recipes for the two components are as follows:

| | Parts by weight | |
|---|---|---|
| | Sol | Gel |
| Chloroprene | 100 | 97 |
| Ethylene dimethacrylate | 0 | 3 |
| Disproportionated rosin (a) | 3 | 3 |
| Diethyl xanthogen disulfide | 0.49 | 0.4 |
| Water | 91.5 | 108.5 |
| Sodium hydroxide (100%) | 0.55 | 0.67 |
| Sodium salt of condensate of formaldehyde and naphthalenesulfonic acid (b) | 0.4 | 0.7 |
| Sodium 2-anthraquinonesulfonate | 0 | 0.007 | a "Resin 731-S," Hercules, Inc.
b "Lomar" PW, Nopco Chemical Co.

The sol component is polymerized at 40° C. to a final monomer conversion of 70%. The catalyst solution is a 0.15% aqueous solution of potassium persulfate containing a trace (about 0.007%) of sodium 2-anthraquinonesulfonate. The gel component is polymerized first at 40° C. using the same catalyst as for the sol polymer and polymerization is completed at 45° C. using a 5% solution of potassium persulfate containing 0.05% of sodium 2-anthraquinonesulfonate. The final monomer conversion is 95%.

The polymerization is stopped by adding emulsions containing the following materials in the indicated parts by weight:

| | Sol | Gel |
|---|---|---|
| Phenothiazine | 0.014 | 0.019 |
| 4-tert-butylpyrocatechol | 0.014 | 0.019 |
| 2,6-di-tert-butyl-4-phenylphenol | 0.03 | 1.4 |

The two latexes are mixed in proportions to give 78 parts of sol polymer and 22 parts of gel polymer, unreacted monomers are removed by steam stripping, pH is adjusted to 5.7 with a 30% acetic acid solution containing 6% of the sodium salt of a condensate formaldehyde and naphthalenesulfonic acid, and the polymer mixture is isolated by freeze rolling.

The processing safety of the compounded stock is measured by determining the Mooney scorch at 121° C. by ASTM Method D 1646-61 using the small rotor. The processing safety of this stock is directly proportional to number of minutes required for a 10-point increase in Mooney viscosity.

Samples of the compounded stock are cured in a mold for 30 minutes at 153° C. and the tensile properties of the cured samples are determined by ASTM Method D 412-64 T.

The results are shown in the Table. In the Table the following abbreviations are used.

DMEA = 2-dimethylaminoethanol
$T_B$ = Tensile strength at break, p.s.i.
$M_{100}$ = Modulus at 100% elongation, p.s.i.
$E_B$ = Elongation at break, percent

TABLE

| | Mooney scorch at 121° C. | | |
|---|---|---|---|
| | Minimum | Minutes to 10-point rise | Tensile properties |
| Curing agent, complex: | | | |
| NiCl$_2$·2DMEA | 28.7 | 9 | $T_B$, 3,270. $M_{100}$, 820. $E_B$, 300. |
| Ni(SCN)$_2$·2DMEA | 27.5 | 18.5 | $T_B$, 3,100. $M_{100}$, 750. $E_B$, 295 |
| Comparisons: | | | |
| ZnCl$_2$ DMEA a | 30.5 | 4.3 | $T_B$, 3,100. $M_{100}$, 800. $E_B$, 290. |
| Zn(SCN)$_2$·DMEA a | 32.8 | 3.2 | $T_B$, 3,140. $M_{100}$, 810. $E_B$, 285 | a Prepared by reacting 2-dimethylaminoethanol with the corresponding zinc salt in essentially the same way as described in Examples 1 and 2. The analysis of the zinc chloride complex indicates the composition (CH$_3$)$_2$NCH$_2$CH$_2$OZnCl. This comparison shows that a significant loss in processing safety occurs when one uses the zinc complexes, even though these complexes provide only one mole of DMEA per mole of complex.

I claim:

1. A complex compound of two moles of 2-dimethylaminoethanol combined with one mole of a nickel salt selected from the group consisting of nickel thiocyanate and nickel chloride.

2. A complex compound of two moles of 2-dimethylaminoethanol combined with one mole of nickel thiocyanate.

3. A complex compound of two moles of 2-dimethylaminoethanol combined with one mole of nickel chloride.

4. In a process for producing a complex compound of claim 1 the steps comprising mixing at least two moles of 2-dimethylaminoethanol with one mole of a nickel salt selected from the group consisting of nickel thiocyanate and nickel chloride in a solvent in which the nickel salt is soluble, evaporating off the solvent and any 2-dimethylaminoethanol in excess of two moles per mole of nickel salt, and recovering the complex compound as a solid product.

References Cited

UNITED STATES PATENTS

| | | | |
|---|---|---|---|
| 2,999,872 | 9/1961 | Craig et al. | 260—439 R |
| 3,038,904 | 6/1962 | Godfrey | 260—439 R |
| 3,131,694 | 12/1964 | Schaeffer | 260—439 R |
| 3,592,870 | 7/1971 | Dunn | 260—439 R |
| 3,686,156 | 8/1972 | Hagman | 260—92.3 |

DANIEL E. WYMAN, Primary Examiner
A. P. DEMERS, Assistant Examiner

U.S. Cl. X.R.
260—92.3